F. K. HOLMESTED.

LOADING MACHINE.

APPLICATION FILED DEC. 29, 1908.

Reissued Feb. 16, 1909.

12,919.

2 SHEETS—SHEET 1.

Witnesses:

C. J. Kesler

J. B. Kesler

Inventor:

Francis Keith Holmested

By

James L. Norris

Atty

F. K. HOLMESTED.

LOADING MACHINE.

APPLICATION FILED DEC. 29, 1908.

Reissued Feb. 16, 1909.

12,919.

2 SHEETS—SHEET 2.

Witnesses:

C. E. Kesler

J. B. Kesler

Inventor

Francis Keith Holmested

By

James L. Norris

Atty.

UNITED STATES PATENT OFFICE.

FRANCIS KEITH HOLMESTED, OF QUINNIMONT, WEST VIRGINIA.

LOADING-MACHINE.

No. 12,919. Specification of Reissued Letters Patent. Reissued Feb. 16, 1909.

Original No. 839,997, dated January 1, 1907, Serial No. 246,768. Application for reissue filed December 29, 1908. Serial No. 469,908.

*To all whom it may concern:*

Be it known that I, FRANCIS KEITH HOLMESTED, a subject of the King of England, formerly residing at Claremont, in the county of Fayette, State of West Virginia, and now residing at Quinnimont, in the county of Fayette, State of West Virginia, have invented new and useful Improvements in Loading-Machines, of which the following is a specification.

My invention relates to an improvement in devices for transferring any class of loose material from the ground or a platform into a conveyer, its object being to produce a device which shall be expeditious and efficient in its operation.

With these and other objects in view my invention consists, broadly, in a revolving wheel or platform adapted to receive the loose material and discharge it upon a conveyer.

It consists, further, in setting the revolving platform at a slight incline to the horizontal.

It consists, further, in a revolving plate in combination with a side plate and a conveyer-belt disposed across the upper face of said plate.

Figure 1:
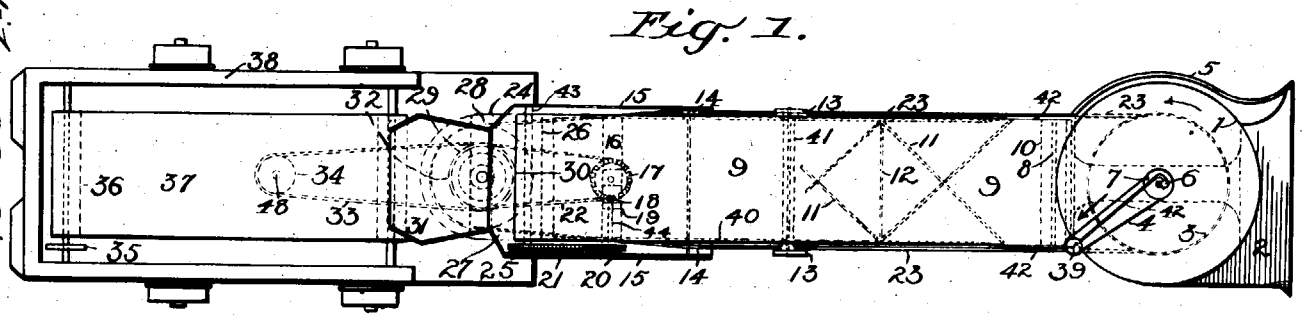
Figure 10:
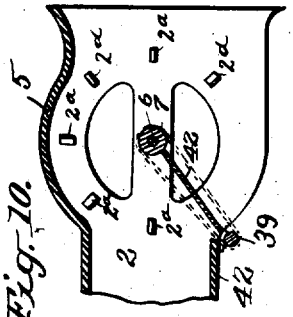
Figure 9:
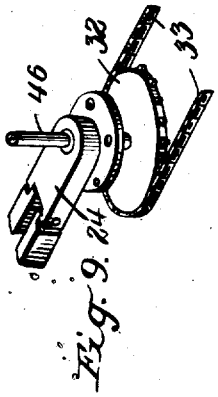
Figure 2:
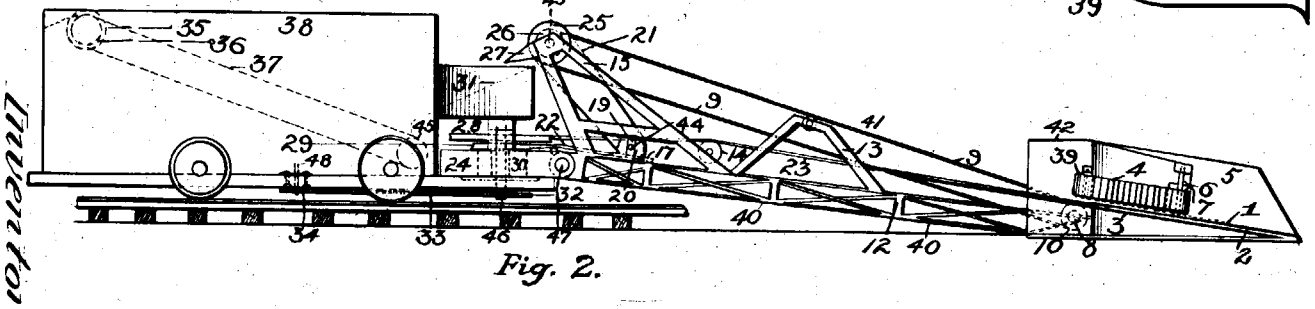
Figure 3:
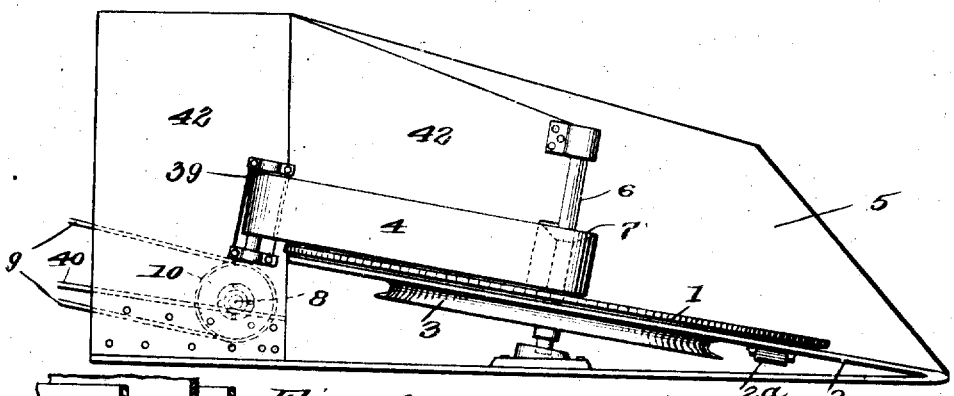
Figure 4:
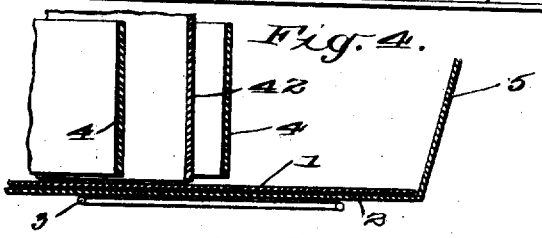
Figure 5:
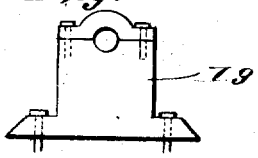
Figure 6:
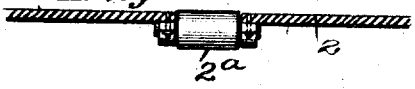
Figure 7:
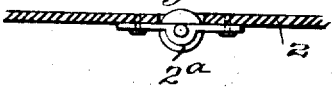
Figure 8:
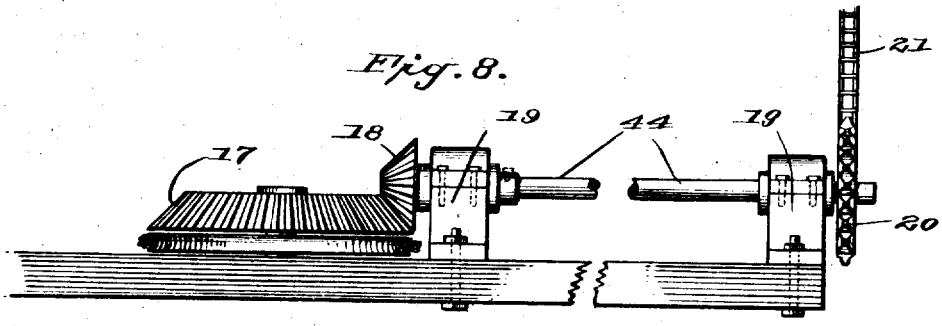

It consists, further, in certain novel features of construction, arrangement, and combination of parts, as will be hereinafter fully described, and pointed out in the claims, reference being had to the accompanying drawings, in which:

Figure 1 is a top plan of my improvement as in use. Fig. 2 is a side view of the same. Fig. 3 is a side elevation of a portion of the device. Fig. 4 is a transverse section across the frame 2 just in rear of shaft 6 and looking toward the rear. Fig. 5 is an elevation of bearing-block 19. Fig. 6 is a detail section showing friction-rollers mounted in frame 2. Fig. 7 is another view of same. Fig. 8 is an enlarged view showing mounting of shaft 44 and mechanism for driving the conveyer belt 9. Fig. 9 is a perspective view showing construction of the device where the pivoted frame is connected to the car. Fig. 10 is a top plan view of front end of frame 2, partly in section and showing shape of side wall 5 and location of antifriction rollers for supporting the revoluble plate 1.

In the drawings, 1 represents a wheel or disk which is revolubly supported at its center and also at a suitable distance therefrom on small roller bearings $2^a$ upon the frame 2. Said wheel is preferably set at an incline and is keyed to shaft 6, which is also inclined and is suitably mounted on frame 2. The side walls of the frame 2 extend forwardly, one being flared, as shown at 5, while the other one is turned inwardly and extends across the face of a wheel or disk 1 to the center of the same, where it is bent to form bearings for a shaft 6.

3 is a transmission-sheave keyed to the lower end of shaft 6, and 7 is a pulley keyed to shaft 6 above the wheel 1. Transmission-sheave 3 is driven from sheave 28 by rope drive 23, running over pulleys 14, mounted in the side of the frame 40.

4 is an endless belt passing round pulley 7 and pulley 39, which is suitably mounted on one of the upright sides 42 of the frame. Said endless belt, which is arranged vertically, extends across the face of the wheel 1 from its center to its circumference, as shown in Fig. 1.

40 represents the main frame of the device, being braced by the rods 11 and 12.

8 is a shaft mounted in frame 2 below wheel 1 at the rear end of said frame, said shaft 8 extending from one side piece 42 to the other and upon which revolves the pulley 10.

9 is an endless conveyer-belt which runs on pulleys 10, 26, and 41. The pulley 10 revolves on a shaft 8, and pulley 26 is keyed to shaft 43. Pulley 41 is supported by and mounted in upright braces 13, extending on each side from the main frame 40, while 15 represents uprights at each side of the frame supporting the upper conveyer-pulley 26.

25 is a sprocket-wheel keyed to shaft 43, power being supplied by a chain drive 21, running over a sprocket 20. Sprocket 20 is keyed to shaft 44, which is supported in boxing 19. The boxing 19 is upon cross-brace 16.

18 represents a miter-gear mounted on one end of shaft 44, said miter-gear 18 engaging the horizontal miter-gear 17, mounted on the cross-brace 16.

22 is a rope drive. Gear 18 transmits power from 17 to shaft 44. The rope drive 22 supplies power to 17 from sheave 29.

24 is the revolving base of the entire frame and permits horizontal movement around 30. 30 is fastened to the bottom of car 38, said bottom projected forward to form a front extension, and 30, which is a casting also relieves shaft 46 of shock.

27 is an apron extending from frame to guide material from conveyer 9 to the pocket 31, projecting from the end of the car 38, said pocket 31 having an inclined bottom, as indicated by dotted lines in Fig. 2. From pocket 31 the material drops onto endless conveyer 37 and is then discharged over the opposite end of the car. Said conveyer-belt 37 is carried by the pulleys 36 and 45. Pulley 36 receives its power from sprocket 35. Sheaves 28, 29 and 32 are keyed to shaft 46.

The entire frame 40 is pivotally mounted at its rear end, as at 47, which permits of a vertical movement of said frame.

48 is a shaft mounted in car 38 and carries at its lower end the pulley 34, which is in engagement with pulley 32 through the band 33. The car 38 carries the machinery for transmitting power to sprocket 35 and to shaft 48, which in turn transmits the power to the other parts of the mechanism through belts and pulleys.

As stated, 24 is the revolving base of the entire frame 40, said base being mounted on the casting 30, so that said frame may be swung to the right or left, as the occasion may require.

One of the side walls 42 is turned inwardly above the upper face of wheel 1, as shown in top view of the machine, and has mounted in an opening in suitable bearings the pulley 39, which, as stated, carries one end of the vertically-disposed endless belt 4. The extreme end of the inturned portion of 42 is bent to form bearings for inclined shaft 6, which has keyed to it the pulley 7, around which the endless belt 4 also runs. Thus it will be seen that one run of the endless belt will always be outside the inturned part of side piece 42.

The operation of the device is as follows: The loose material entering frame 2 drops onto wheel 1, which revolves in the direction of the arrow, and is carried around inside the flared side 5 and against the vertically arranged endless belt 4, which travels in the direction indicated by the arrow, the lower edge of said endless belt lying in close proximity to the upper face of the wheel 1. This endless belt 4 retards the rotary movement of the material and guides it rearwardly onto the conveyer 9, from which it is discharged into pocket 31, and said pocket having an inclined floor discharges the material onto conveyer 37, whence it is discharged to the desired receptacle.

The front edge of frame 2 is sharpened, so that it may be used to scrape or excavate earth and guide it up to the inclined wheel 1.

While I have shown a vertically disposed endless belt above the wheel or disk 1, I do not limit myself to such a device, but any suitable form of conveyer or deflector may be used. The deflector, it will be seen, runs from the center of the revoluble plate 1 to its periphery, giving the effect of more space, and enables the utilization of the said plate 1 to its fullest capacity. The deflector, which is an endless belt, is also operated from the same shaft as the plate 1. As shown in Fig. 3, this revoluble plate 1 rests on the antifriction rollers mounted in the bed-plate 2, said bed-plate extending forwardly to form a shovel operating in connection with the base or bottom.

Having thus described my invention, what I claim as new, and desire to secure by Letters Patent, is:

1. In a loading machine, a frame adapted to receive loose material, a revoluble plate mounted on said frame, and adapted to receive the loose material upon its face, a vertically disposed endless belt located above said revoluble plate, said belt traveling rearwardly whereby the material on the revoluble plate will be carried to the rear, and conveyers extending from the rear of said frame.

2. In a loading machine, a frame having a flaring side and adapted to receive loose material, a revoluble wheel or plate mounted on said frame at a slight inclination from the horizontal plane, and conveyers extending from the rear of revoluble wheel or plate.

3. In a loading machine, a frame having side walls and adapted to receive loose material, a revoluble wheel or plate mounted on said frame and a belt conveyer disposed below the rear edge of said revoluble plate, and extending rearwardly therefrom.

4. In a loading machine, a frame having side walls and adapted to receive loose material, a revoluble wheel or plate mounted on said frame at an inclination, an endless belt vertically disposed and mounted to run rearwardly above said revoluble wheel, and a belt conveyer located beneath the revoluble plate and extending rearwardly therefrom.

5. A loading machine, consisting of a main frame having a vertical and horizontal movement on a receptacle, said frame carrying at its front end a scraper-frame, a revoluble wheel mounted in said scraper-frame and revolving in an inclined plane, an endless belt vertically disposed above the upper surface of the revoluble wheel, and extending from the center to the circumference of said revoluble wheel, and a belt conveyer extending from beneath the revoluble wheel, rearwardly to discharge into the vehicle carrying the main frame.

6. In a loading machine, the combination with a car or vehicle and a platform projecting forwardly from the front end thereof, of a frame pivotally mounted on said forwardly projecting platform, a pocket projecting from the front of the car, an endless conveyer mounted in the pivotally mounted frame, a horizontally revolving wheel or plate mounted at the front portion of the pivoted frame, and a vertically disposed endless belt mounted in said frame and extending from the center to the circumference of the revolving wheel to carry material dropped on the wheel to the rear and deposit the same upon the endless conveyer to be carried to the pocket on the car.

7. In a loading machine, the combination with a scraper-frame having one side wall flared and the other side wall turned inwardly, a horizontally revolving wheel or plate mounted on said scraper frame at an angle to a horizontal plane on a shaft extending through the inturned end of the side wall and the scraper frame, an endless belt vertically disposed and running from the inturned end of the side wall rearwardly to the circumference of the revolving wheel or plate, means for revolving the wheel and the endless belt, an endless conveyer located beneath the rear portion of the wheel and extending upwardly therefrom, a frame carrying said endless conveyer and pulleys for the same, a car or receptacle at the rear of said conveyer, said conveyer frame being pivotally mounted on the front of said car to swing vertically and horizontally, and means for driving the endless conveyer, and a conveyer within said car.

8. In a loading device, a frame or base adapted to receive loose material, a plate or disk revolubly mounted on said frame at an inclination and adapted to receive the loose material upon its upper face, and a deflector disposed over the upper face of the revoluble plate or disk from its axis to its outer edge.

9. In a loading device, a frame adapted to receive loose material, a plate or disk revolubly mounted at an inclination on said frame, and adapted to receive loose material on its upper face and a moving deflector disposed across the upper face of the plate or disk, said deflector adapted to retard and force the loose material rearwardly.

10. In a loading device, a frame adapted to receive loose material and having a flaring side wall, a revoluble plate or disk mounted at an inclination in said frame adapted to receive the loose material on its upper face, and a vertically disposed conveyer located above said revoluble plate or disk.

11. In a loading device, a solid revoluble plate or disk adapted to receive loose material on its upper face, said plate or disk disposed at a slight inclination rearwardly from a horizontal plane, and a deflector disposed across the upper face of said plate or disk adapted to retard and force the loose material on the upper face of the plate or disk rearwardly.

12. In a loading device, a frame or base, a plate or disk revolubly mounted on said base and adapted to receive the loose material upon its upper face, and a deflector disposed over the upper face of said plate or disk from its axis to its outer edge.

13. In a loading device, a frame or base, a solid plate or disk revolubly mounted on said frame and adapted to receive the loose material upon its upper face, and a vertically disposed endless belt superimposed on said plate or disk and extending from its axis to its outer edge.

14. In a loading device, a frame or base, a solid plate or disk revolubly mounted on said base at an angle to the vertical, and a deflector superimposed on said plate or disk, said deflector extending from the axis of said plate or disk to its outer edge.

15. In a loading device, a frame or base having a forwardly extending shovel-nose adapted to enter and receive loose material thereon, a plate or disk revolubly mounted on said base at an angle, and a deflector superimposed on said plate or disk, said deflector extending from the axis of said plate or disk to its outer edge.

16. In a loading device, a frame or base having a beveled forwardly extending nose adapted to enter and receive loose material thereon, a plate or disk revolubly mounted thereon and adapted to receive the loose material on its upper face, and a vertically disposed endless belt superimposed on said plate or disk, and mounted at one end on the axis of the plate or disk, and extending at its opposite end to the outer edge of said plate or disk.

17. In a loading machine, a frame for receiving loose material, a revoluble wheel or plate mounted in the frame at an inclination, and conveying means coöperating with the frame and to which the plate delivers the loose material.

18. In a loading machine, a frame for receiving loose material, a revoluble wheel or plate mounted on the frame, and a conveyer in operative association with the wheel or plate and on which the latter deposits the loose material.

19. In a loading machine, a frame for receiving loose material, a revoluble wheel or plate mounted on the frame at an inclination, an endless conveyer disposed over the plate and mounted to run rearwardly, and a conveyer coöperating with the wheel or plate to receive the loose material from the latter.

20. In a loading device, a frame to receive loose material, a plate or disk revolubly mounted at an inclination on said frame to receive the loose material on its upper portion, a movable deflector disposed over and coöperating with the upper portion of the plate or disk to direct the loose material rearwardly, and a conveyer operatively associated with the plate or disk to receive the loose material from the latter.

21. In a loading device, a frame to receive loose material, a revoluble plate or disk mounted at an inclination in said frame to receive the loose material on its upper side, and a conveyer operatively associated with and located above the said revoluble plate or disk.

22. In a loading device, a receiving frame for loose material, a revolving wheel or platform held by the said frame for carrying the loose material from one point to another, and a conveyer upon which the wheel or platform discharges the loose material.

23. In a loading device, a frame for receiving loose material and having a rotatable means for carrying the loose material from the receptive extremity to the discharge extremity of said frame, and a conveying means operatively associated with the discharge extremity of the frame and the said movable means.

24. In a loading device, a frame for receiving loose material and having a rotatable means for carrying the loose material from the receptive extremity to the discharge extremity of said frame, a deflecting means over said movable means for facilitating the discharge of the loose material from the said movable means, and a conveying means operatively associated with the discharge extremity of the frame and the said movable means.

25. In a loading machine, a frame having a receptive extremity for loose material, rotatable means held by the frame and inclining towards the receptive extremity of the latter and operating to carry the loose material from the receptive extremity of the said frame to the discharge extremity of the same, and a conveying means operatively associated with the discharge extremity of the frame and said rotatable means.

26. In a loading device, a frame having a receptive extremity for loose material and an upwardly projecting side wall, a rotatable feeding means held by the frame and operating to carry the loose material towards and discharge it from the rear of said frame, the side wall preventing the material from being thrown off the rotatable means, and a conveying means operatively associated with the discharge portion of the said rotatable means.

27. In a loading machine, a frame for receiving loose material having a side wall, and a rotatable feeding means mounted in the frame for conveying the loose material from one point to another, the wall of the frame coöperating with the said feeding means and preventing the loose material from being thrown off the latter.

In testimony whereof I have hereunto set my hand in the presence of two subscribing witnesses.

FRANCIS KEITH HOLMESTED.

Witnesses:

CHAS. S. HYER,

C. A. ROWE.